(12) United States Patent
Harlin et al.

(10) Patent No.: US 6,469,110 B1
(45) Date of Patent: Oct. 22, 2002

(54) PROCESS FOR PREPARING POLYPROPYLENE ALLOYS

(75) Inventors: Ali Harlin, Vantaa; Kauno Alastalo, Porvoo; Jouni Kivelä, Helsinki; Esa Korhonen, Porvoo, all of (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/446,333

(22) PCT Filed: Jun. 24, 1998

(86) PCT No.: PCT/FI98/00555
§ 371 (c)(1),
(2), (4) Date: Feb. 14, 2000

(87) PCT Pub. No.: WO98/58977
PCT Pub. Date: Dec. 30, 1998

(30) Foreign Application Priority Data

Jun. 24, 1997 (FI) .................................................. 972729

(51) Int. Cl.⁷ ................................ C08F 2/14; B01J 8/00
(52) U.S. Cl. ............................ 526/65; 526/64; 526/88; 526/128; 526/129; 526/901; 526/905; 526/920; 525/52; 525/53; 422/132; 422/134; 422/139
(58) Field of Search ..................... 525/53, 52; 526/64, 526/65, 88, 128, 129, 351, 901, 920, 68, 905; 422/132, 134, 139

(56) References Cited

U.S. PATENT DOCUMENTS

| | | | |
|---|---|---|---|
| 3,622,553 A | 11/1971 | Cines | |
| 4,368,291 A | 1/1983 | Frese et al. | |
| 4,424,341 A | 1/1984 | Hanson et al. | |
| 4,492,787 A | * 1/1985 | Takashima et al. | ........... 525/53 |
| 4,543,399 A | 9/1985 | Jenkins et al. | |
| 4,588,790 A | 5/1986 | Jenkins et al. | |
| 4,740,550 A | 4/1988 | Foster | |
| 4,740,551 A | 4/1988 | Foster | |
| 4,808,667 A | * 2/1989 | Goko et al. | .................. 525/247 |
| 4,978,722 A | * 12/1990 | Goko et al. | ................ 525/53 X |
| 5,234,879 A | 8/1993 | Garoff et al. | |
| 5,385,992 A | 1/1995 | Koskinen et al. | |
| 5,854,355 A | * 12/1998 | Oka et al. | .................. 525/53 X |
| 6,084,041 A | * 7/2000 | Andtsjo et al. | ........... 525/53 X |

FOREIGN PATENT DOCUMENTS

| | | |
|---|---|---|
| EP | 089691 A2 | 9/1983 |
| EP | 517183 A2 | 12/1992 |
| EP | 560312 A1 | 9/1993 |
| EP | 607703 A1 | 7/1994 |
| EP | 627449 A1 | 12/1994 |

(List continued on next page.)

OTHER PUBLICATIONS

File WPI, Derwent accession No. 83–803582, Mitsu Bishi Chem Ind Ltd. (Abstract).

(List continued on next page.)

*Primary Examiner*—Fred Teskin
(74) *Attorney, Agent, or Firm*—Birch Stewart Kolsch & Birch, LLP.

(57) ABSTRACT

Described herein is a process and an apparatus for polymerizing propylene. The process comprises carrying out the polymerization in at least one slurry reactor and at least one gas phase reactor without recycling unreacted monomers to the slurry reactor. A polymerization product containing unreacted monomers is recovered from the slurry reactor and volatile components are separated from the product in a separation unit. The polymerization product is recovered from the separation unit and conducted to a first gas phase reactor; and at least a part of the volatile components a recovered from the separation unit and conducted them to a gas phase reactor. At least 10% of the polymer product is produced in the gas phase reactor(s). The invention provides propylene homopolymers and alloys of propylene homopolymers and copolymers having good impact and creep properties.

40 Claims, 1 Drawing Sheet

FOREIGN PATENT DOCUMENTS

| | | |
|---|---|---|
| FI | 961152 | 9/1997 |
| GB | 1532231 | 11/1978 |
| WO | WO 88/02376 | 4/1988 |
| WO | WO 92/12181 | 7/1992 |
| WO | WO 92/12182 | 7/1992 |
| WO | WO 92/19653 | 11/1992 |
| WO | WO 92/19658 | 11/1992 |
| WO | WO 92/19659 | 11/1992 |
| WO | WO 94/25495 | 11/1994 |
| WO | WO 94/28032 | 12/1994 |
| WO | WO 96/04321 | 2/1996 |
| WO | 9713790 | 4/1997 |
| WO | WO 98/12234 | 3/1998 |

OTHER PUBLICATIONS

File WPI, Derwent accession No. 91–146186, Mitsubishi Kasei Corp. (Abstract).

Front page of FI 906282 corresponds to US 5,234,879.

English abstract of FI 971368.

English abstract of FI 971367.

Front page of FI 932580 corresponds with EP 0 627 449 A1.

Front page of FI 925913 corresponds with EP 0 607 703 A1.

Front page of FI 912264 corresponds with WO 92/19659.

Front page of FI 912263 corresponds with WO 92/19658.

Front page of FI 912262 corresponds with WO 92/19653.

Front page of FI 906428 corresponds with WO 92/12182.

Front page of FI 906427 corresponds with WO 92/12181.

English abstract of JP 1263107.

Hydrocarbon Processing, Nov. 1984 113–117 DiDrusco et al "Polyproylene . . . ".

\* cited by examiner

Fig. 1

PROCESS FOR PREPARING POLYPROPYLENE ALLOYS

This application is the national phase under 35 U.S.C. §317 of PCT International Application No. PCT/FI98/00555 which has an International filing date of Jun. 24, 1998 which designated the United States of America.

BACKGROUND OF THE INVENTION

1. Field of the Invention

The present invention relates to propylene polymerization. In particular, the present invention concerns a process for preparing alloys of homopolymers and copolymers of propylene in a reactor system comprising a combination of at least one slurry reactor and at least one gas phase reactor.

2. Description of Related Art

A large number of processes for preparing propylene homo- and copolymers are known in the art. Thus, for example when $MgCl_2*TiCl_4$, a conventional, supported high-yield catalyst, is used for polymerization, numerous different kinds of bulk and gas phase processes can be employed. The bulk process is a slurry process, wherein the reaction takes place in pure monomer or in a reaction medium containing more than 60 wt-% of the monomer. The method is very useful because of high productivity, and no inert hydrocarbon intermediate is needed. The gas phase processes have lower activity, but instead their investment costs are lower in particular because no special recovery is needed for monomer recycling. The operation of gas phase processes is safer due to low monomer inventory and low pressure. A further advantage is the possibility to produce high comonomer content products.

In following, the various features of bulk and gas phase processes will be discussed in some detail.

Polymers formed during bulk polymerization, in particular polymers of high comonomer content and/or low molar mass or low isotacticity, are soluble in the reaction medium. This causes considerable problems in bulk/slurry polymerization applications. Many of these problems can be solved as described in, e.g., FI Patent Application No. 906427 (WO 92/12181) and 906428 and (WO 92/12182) and International Patent Application WO 92/12181 by using super critical slurry processes where the reaction medium is under critical temperature and pressure. By nature the super critical fluid has lower polymer solving power, and nearly unlimited solubility of gaseous components, e.g. hydrogen. Simultaneously, the separation of the recycled reaction medium and recovered polymer is simplified, because of the energy available in the polymerization product.

In case of a bulk reactor, recovery and recycling of the unreacted monomer is always needed for economic operation, because up to 50% of the mass of the slurry is liquid. Usually, the monomers are separated from the polymer of the polymerization product in a flash system. In practice, the polymerization product from the reactor outlet is heated and expanded in a flash pipe and/or flash tank in order to evaporate the reaction medium. The evaporated reaction medium is separated for recovery e.g. by condensing. The flash pipe can be jacketed and heated preferably by steam Hydr. Carb. Proc, November 1984 p. 113–117, DiDrusco&Rinaldi.

There are some problems related to conventional flash systems. Thus, any non-evaporated liquid in the separation tank is a risk for blocking the device. The flash system is highly sensitive to high soluble polymer fractions, e.g. with high comonomer content or low molar mass, but also to fines in the polymer product. This is particularly true for cyclone type of devices operated at high pressures.

The recovery of the monomer can be simplified by condensing the off gas with cooling water Hydro carb. Proc., November 1984 p. 113–117, DiDrusco&Rinaldi. Thus, the off gas has to be pressurised with a compressor, or even more advantageously, by using high enough off gas separation pressure. The hydrogen concentration is not limited in gas phase reactors. The gas phase reactor also provides flexible production rate control because the bed level and monomer pressure can be controlled.

In a fluidized bed reactor the heat transfer is better than in a mechanically fluidized reactor but inferior to the heat transfer in a bulk loop reactor. The cooling of the fluid bed reactor is effective due to high circulation flow of reactor gas through the heat transfer, and it can be further improved by cooling the circulation gas below the dew point of the gas, cf. EP 0 089 691, U.S. Pat. Nos. 4,543,399, 4,588,790, WO 96/04321. Conventionally up to 20 wt-% of the circulation stream can be condensed, and with a special control arrangements up to 50 wt-% is possible, cf. U.S. No. 93/03,946, WO 94/25495. It is also possible to separate the condensed monomer and light hydrocarbons in a knock-out drum, and feed it back to the fluid bed reactor with special nozzles, GB 94/01074, WO 94/28032.

None of the above-described processes is particularly well suited for the production of different kinds of homo- and copolymers of propylene.

In order to draw benefit from the different advantages of the slurry bulk and the gas phase processes, a number of combined bulk and gas phase processes have been suggested in the prior art.

For polymerization of vinyl chloride, there has been described in the prior art a slurry/gas phase reactor cascade where the first reactor is a loop reactor, and the content of the loop reactor is lead to a second reactor, which is a fluidized bed reactor (cf. U.S. Pat. No. 3,622,553). The polymerization is continued in the fluidized bed.

Polymerization of propylene in a loop reactor, which can be operated in supercritical conditions, is disclosed in U.S. Pat. No. 4,740,550. The product of the loop reactor is conducted to a gas phase reactor, wherein the reaction is continued. Before entering the gas phase the fines fraction of the polymerization product of the loop reactor is removed and circulated back to the loop reactor. Together with the fines, a part of the monomers are recycled. The loop reactor is merely used for prepolymerization because the loop reactor residence time has to be short <30 min. Also feeding the fines back to the loop reactor will eventually fill up the loop reactor with inactive fines. The preferred embodiment of the prior art process comprises preparing 50 to 95%, in particular 70 to 90%, of the product in the loop. Further, the extensive recycling from the gas phase reactor back to the loop is arranged by condensing. As a result no product having broad or bimodal molar mass distribution can be prepared.

For polymerization of olefins a process is known in which the first reaction is made in liquid, and the second reaction in the absence of the liquid, GB Patent No. 1 532 231.

A two-step process has also been suggested for polymerization of ethylene, cf. U.S. Pat. No. 4,368,291.

A slurry prepolymerization connected to the gas phase process is proposed in WO 88/02376.

A gas phase process for polyolefins, where a special catalyst with spherical form is employed, has been proposed in EP-A 0 560 312 and EP-A 0 517 183. The catalyst is prepolymerized in a loop reactor using more than 5 parts polymer and 1 part catalyst up to 10% (w/w) of total production.

Some of the disadvantages associated with the loop and gas phase reactors, respectively, are avoided by the suggested prior art processes. However, none of them meets the requirements for flexibility and low production costs dictated by the production of large varieties of polyolefin qualities using one and the same process configuration. The recycling of rather large amounts of unreacted monomers to the slurry reactor impairs the loop reactor dynamics and slows up the transition to novel product qualities.

SUMMARY OF THE INVENTION

It is an object of the present invention to eliminate the problems related to the prior art of single and multiple-reactor processes and to provide a novel process for preparing homopolymers and copolymers of propylene.

It is another object of the invention to provide a highly versatile process which can be used for preparing a wide range of different homopolymer and copolymer products of propylene, in particular alloys of homopolymer and random copolymers optionally also having very different molar masses.

It is a further object of the invention to provide for the production of conventional homo- and copolymers, and to provide a process enabling tailoring of their molar mass distributions and comonomer distribution.

These and other objects, together with the advantages thereof over known processes, which shall become apparent from specification which follows, are accomplished by the invention as hereinafter described and claimed.

The process according to the present invention is based on the use of a combination of at least one slurry reactor and at least one gas phase reactor connected in series, in that order, to form a cascade. Propylene homo- and copolymers are prepared in the presence of a catalyst at elevated temperature and pressure. According to the invention, the reaction product of at least one slurry reactor is subjected to product separation by reducing the pressure thereof to evaporate volatile components. The solid substances of the product separation operation are conducted to a first gas phase reactor. The evaporated reaction medium including the unreacted monomers are separated from the other volatile components and also fed to a gas phase reactor, whereas hydrogen and inert hydrocarbons (e.g. lower alkanes), if any, are removed.

More specifically, the process according to the present invention is mainly characterized by (a) polymerizing propylene optionally with comonomers in the presence of a catalyst at an elevated temperature of at least 60 C. and at an elevated pressure in at least one slurry reactor and at least one gas phase reactor, at least 10% of the polymer product being produced in the gas phase reactor(s); (b) recoverying from the slurry reactor a polymerization product containing unreacted monomers; (c) separating volatile components from the product in a separation unit (d) recovering the polymerization product from the separation unit and conducting it to a first gas phase reactor, and (e) recovering at least a part of the volatile component from the separation unit and conducting them to a gas phase reactor essentially without recycling unreacted monomers to the slurry reactor.

The invention achieves a number of considerable advantages. With the present arrangement it has been found that the monomer fed into the first reactor can, to a large extent or fully, be consumed in the gas phase reactor(s) after the slurry reactor. This is possible due to gas phase operation with high gas hold-up and a minimum of off-gases. The loop reactor dynamics in the cascade provides fast transitions. Fast start-ups are also possible because the gas phase bed material is available directly from the loop reactor. With the loop and gas phase reactor cascade it is possible to produce a large variety of different bimodal products. The at least one gas phase reactor provides high flexibility in the reaction rate ratio between the first and second part of the product because of adjustable bed level and reaction rate. Further, the gas phase reactor having no solubility limitations makes it possible to produce polymers of high and very high comonomer content or, alternatively, very high melt flow rate.

The separation of light components before feeding of the recovered monomer to the gas phase makes it possible independently to control polymerization conditions and provides maximum flexibility for polymer alloy preparation.

DETAILED DESCRIPTION OF THE INVENTION

DEFINITIONS

For the purpose of the present invention, "polymer alloy" or "alloy" denotes a combination of (propylene) polymers of essentially different composition having a synergetic influence on the strength properties of the combination.

"Slurry reactor" designates any reactor, such as a continuous or simple stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor.

By "gas phase reactor" is meant any mechanically mixed or fluid bed reactor. Preferably the gas phase reactor comprises a mechanically agitated fluid bed reactor with gas velocities of at least 0.2 m/sec.

"High temperature polymerization" stands for polymerization temperatures above a limiting temperature of 80° C. known to be harmful for high yield catalysts of related prior art. At high temperatures the stereospecificity of the catalyst and the morphology of the polymer powder can be lost. This does not take place with the particularly preferred type of catalysts used in the invention which is described below. The high temperature polymerization takes place above the limiting temperature and below the corresponding critical temperature of the reaction medium.

"Super critical polymerization" designates polymerization that takes place above a corresponding critical temperature and pressure of the reaction medium.

By "indirect feed" is meant a process wherein the content of the slurry reactor is fed into the gas phase reactor fluidized bed, the polymerization product via a reaction medium separation unit and the reaction medium as an off gas from the separation unit. Before the reaction medium is entered into the gas phase, some component, e.g. hydrogen, can be fully or partially removed therefrom with various technical means, such as membranes or by condensing.

"Reaction zone" stands for one or several reactors of similar type producing the same type or characteristics of polymer connected in the series.

The expressions "essentially without monomer recycling" and "with minimum or no monomer recycling" are synonymously used to indicate that less than 30 wt-%, preferably less than 20 wt-%, and in particular none of the monomers of the slurry reactor feed are recycled to the slurry process. By contrast, normally 50 wt-% or more of the slurry process feed is recycled.

The Overall Process

The present invention concerns a multistage process consisting of a bulk reaction zone including at least one slurry reactor, and a gas phase reaction zone including at least one gas phase reactor in cascade after at least one slurry reactor with a minimum or no recycling of monomer back to the first reactor and with indirect feed to the gas phase for homo- or copolymerizing propylene.

The product outlet from the slurry reactor can be discontinuous, or preferably continuous, as described in FI Patent Applications Nos. 971367 and 971368. The slurry is led as such without separation of any particle streams based on different particle size. No particles are returned to the slurry reactor. Optionally, the conduit between the slurry reactor and the reaction medium separation unit can be heated.

The content of the slurry reactor is first conducted into a reaction medium separation unit. The polymer is separated from the reaction medium and fed into the gas phase reactor fluidized bed from said separation unit. The gas from the separation unit is conducted into the gas phase reactor in gaseous form. However, before entering the gas phase the gas from the separation unit is fully or partially freed from, e.g. hydrogen, using various technical gas separation means e.g. membranes, distillation or stripping. Alternatively the gas can be condensed, and optionally hydrogen or other light components can be removed before the liquid monomer is fed into the gas phase reactor. Gaseous monomer can be fed to any suitable place in the gas phase reactor, e.g. into the recycle stream before the compressor of such a stream or directly into the reactor. The liquid monomer can be fed optionally into the polymer bed, above the gas distribution plate, e.g. into the powder feed line or, even more preferably, into the recycle stream before or after the gas phase circulation heat exchanger (circulation cooler).

The reaction is continued in the gas phase reactor(s). All monomer entering the gas phase from the slurry reactor is part of the reactor gas inventory until it is converted into the polymer.

In two reactor operation the polymer leaving the gas phase reactor with the outlet system enters a solid/gas separation unit. The polymer from the bottom is fed to further processing steps and the gas is compressed and circulated back to the gas phase reactor after purification steps. Typically light inerts, such as methane and ethane, and heavier inerts such as propane and oligomers are removed in these purification steps. The purification can be performed with distillation or membrane separation. In case of distillation the monomers are circulated back to the gas phase reactor mainly as liquid.

In three reactor operation the polymer leaving the 1st gas phase reactor with the outlet system enters a solid/gas separation unit. The polymer from the bottom is fed further to 2nd gas phase reactor and the gas is compressed and circulated back to the 1st gas phase reactor after purification steps. Typically light inerts, such as methane and ethane, and heavier inerts such as propane and oligomers are removed in these purification steps. The purification can be performed with distillation or membrane separation. In case of distillation the monomers are circulated back to the gas phase reactor mainly as liquid.

Optionally in three reactor operation the polymer leaving the 1st gas phase reactor with the outlet system enters the 2nd gas phase reactor directly with the accompanying gas.

In three reactor operation the polymer leaving the 2nd gas phase reactor with the outlet system enters a solid/gas separation unit. The polymer from the bottom is fed to further processing steps and the gas is compressed and partly circulated back to the 2nd gas phase reactor directly, partly after purification steps. Typically light inerts, such as methane and ethane, and heavier inerts such as propane and oligomers are removed in these purification steps. The purification can be performed with distillation or membrane separation. In case of distillation an ethylene rich stream is circulated back to the 2nd gas phase reactor and a propylene-propane stream is fed to propane and oligomers removal steps.

The polymerization products are obtained by using a catalyst. The catalyst can be any catalyst providing adequate activity at elevated temperature. The preferred catalyst system used comprises a high yield Ziegler-Natta catalyst having catalyst component, a co-catalyst component, an external donor and, optionally, an internal donor. Another preferred catalyst system is a metallocene-based catalyst having a bridged ligand structure giving high stereoselectivity, and which is impregnated on a carrier or support in the form of an activated complex.

The polymerization temperature for homopolymers is at least 80° C. and for copolymers at least 60° C. The slurry reactor is operated at elevated pressure at least 35 bar up to 100 bar, and the gas phase reactor(s) at least 10 bar up to dew point pressure. Alternatively any reactor of the reactors in the series can be operated above the critical temperature and pressure, but lower than the melting/fusing point of the corresponding polymer produced.

Propylene and optionally one or more other $C_2$ to $C_{16}$ olefins, e.g. ethylene, 1-butene, 4-methyl-1-pentene, 1-hexene, dienes, or cyclic olefins, is subjected to polymerization and copolymerization, respectively, in a plurality of polymerization reactors connected in series. The optional olefin(s) can be used in any of the reactors. Different amounts of hydrogen can be used as a molar mass modifier or regulator in any or every reactor.

The desired homo- or copolymers of propylene can be recovered from the product separation means of the gas phase reaction zone.

The Catalyst

As catalyst any stereospecific catalyst for propylene can be used, which has high yield and useful polymer properties e.g. isotacticity and morphology at the high temperature and possible supercritical polymerization.

The polymerization products are obtained by using a catalyst. The preferred catalyst system used comprises a high yield Ziegler-Natta catalyst having catalyst component, a cocatalyst component, optionally, an external donor and an internal donor. Another preferred catalyst system is a metallocene catalyst having a bridged ligand structure giving high stereoselectivity, and which has an active complex impregnated on a carrier. Finally, the catalyst is preferable any other catalyst providing adequate activity at elevated temperature.

Examples of suitable systems are described in, for example, Finnish Patent Nos. 86866 (U.S. Pat. No. 5,234,879), 96615 (EP 627 449), 88047 (WO 92/19653), 88048 (WO 92/19658), and 88049 (WO 92/19659).

One particularly preferable catalyst, which can be used in the present invention, is disclosed in FI Patent No. 88047 (WO 92/19653). Another preferred catalyst is disclosed in Finnish Patent Application No. 963707 (WO 98/12234).

Prepolymerization

The catalyst can be prepolymerized prior to feeding into the first polymerization reactor of the series. During prepolymerization the catalyst components are contacted with a monomer, such as an olefin monomer, before feeding into the reactor. Examples of suitable systems are described in, for example, FI Patent Application No. FI 961152.

It is also possible to carry out the prepolymerization in the presence of a viscous substance, such as an olefinic wax, to provide a prepolymerized catalyst which is stabile during storage and handling. The catalyst prepolymerized in wax will allow for easy dosing of the catalyst into the polymerization reactors. Examples of suitable systems are described in, for example, FI Patent No. 95387. 32. Typically about 1 part of catalyst is used for a maximum of 4 parts of polymer.

The monomer used for prepolymerization can be selected from the group consisting of propylene, 1-butene, 4-methyl-1-pentene, 3-methyl-1-butene, vinylcyclohexane, cyclopentene, 1-hexene, 1-octene, and 1-decene.

The prepolymerization can be performed batchwise in wax or in a continuous prepolymerization reactor or in a continuous plug flow type prepolymerization reactor.

Polymerization

The invention is based on the combination of at least one slurry reactor and at least one gas phase reactor connected in series, called a cascade.

The equipment of the polymerization step can comprise polymerization reactors of any suitable type. The slurry reactor can be any continuous or batch stirred tank reactor or loop reactor operating in bulk or slurry and the polymer forms in particular form in the reactor. Bulk means a polymerization in reaction medium that comprises of at least 60% (w/w) monomer. The gas phase reactor can be any mechanically mixed or fluid bed reactor.

According to the present invention the slurry reactor is preferably a bulk loop reactor and the gas phase reactor is a fluidized bed type reactor with a mechanical stirrer.

Any reactor in the process can be a super critical polymerization reactor.

The production split between the slurry reactor and the 1st gas phase reactor(s) is 67:33–50:50 when monomer recycling back to the slurry reactor is allowed. By contrast, the production split between the slurry reactor and the gas phase reactor(s) is less than or equal to 50:50 when no recycling back to the slurry reactor is required. In all the cases the production in the slurry reactor is more than 10 wt-% (split is greater than 10:90). Thus, according to a preferred embodiment, 10 to 50% of the polymer is prepared in the slurry reaction zone and no monomer is recycled. When 50% to 67% of the polymer is prepared in the slurry reaction zone, a small monomer amount of the monomer has to be recycled to the slurry reactor from the gas phase reaction zone.

According to the invention, the polymerization process comprises at least the following steps of subjecting propylene and optionally other olefins to polymerization or copolymerization in a first slurry polymerization zone or reactor, recovering the first polymerization product from the first reaction zone with the reaction medium, indirecly feeding the first polymerization product into a gas phase polymerization zone or reactor, optionally feeding additional propylene or comonomer to the second reaction zone, subjecting the excess propylene and/or comonomers from the 1st zone and additional propylene and/or comonomer(s) to a second polymerization reaction in the presence of the first polymerization product to produce a second polymerization product, recovering the polymerization product from second reaction zone, and separating and recovering the polypropylene from the second reaction product.

Additionally the process can comprise also the following additional steps of recovering the polymerization product from the second reaction zone, feeding the recovered polymerization product of the earlier zones to a third or fourth reaction zone or reactor, optionally feeding additional propylene and/or comonomer(s) to the third and fourth reaction zone, subjecting the excess propylene and/or comonomer(s) to the third and fourth polymerization reaction in the presence of the polymerization product of the earlier zones to produce a third or fourth polymerization product, and recovering the polymerization product from the third or fourth reaction zone, and separating and recovering the polypropylene from the third or fourth reaction product.

In the first step of the process, propylene with the optional comonomer(s) together with the activated catalyst complex and optional cocatalyst and other aid components are fed into the first polymerization reactor. Along with these components hydrogen as a molar mass regulator can be fed into the reactor in the amount required for achieving the desired molar mass of the polymer. In the embodiment of no circulation back to the slurry reactor only fresh monomer is fed into the first reactor.

Alternatively, in the embodiment of minimum recycling of the monomer back to the slurry reactor, the feed of the reactor can consist of the recycled monomer from the following reactor(s), passed through recovery system, if any, together with added fresh monomer, hydrogen, optional comonomer(s) and catalyst components.

In all of the embodiments the presence of propylene, optional comonomer(s), cocatalyst and other aid components, the activated catalyst complex will polymerize and form a product in particulate form in the slurry reactor, i.e. polymer particles, which are suspended in the fluid circulated in the reactor.

The polymerization medium typically comprises the monomer and/or a hydrocarbon, and the fluid is either liquid or gaseous. In the case of slurry reactor, in particular a loop reactor, the fluid is liquid and the suspension of polymer is circulated continuously through the slurry reactor, whereby more suspension of polymer in particle form in hydrocarbon medium or monomer will be produced. According to preferred embodiment, the first polymerization or copolymerization reaction is carried out in a reaction medium mainly consisting propylene. Preferably at least 60 weight percent of the medium is propylene.

The conditions of the slurry reactor are selected so that at least 10 wt-%, preferably at least 12 wt-% of the whole production is polymerised in the first slurry reactor. The temperature is in the range of 40 to 110° C., preferably in the range of 50 to 100° C., and even more preferably for homopolymers 80 to 100° C. and for copolymers 60 to 80° C. The reaction pressure is in the range of 30 to 100 bar, preferably 35 to 80 bar.

In slurry polymerization zone more than one reactor can be used in series. In such a case the polymer suspension in an inert hydrocarbon or in monomer produced in the 1st slurry reactor is fed without separation of inert components and monomers periodically or continuously to the following slurry reactor, which acts at lower pressure than the previous slurry reactor.

The polymerization heat is removed by cooling the reactor with a cooling jacket. The residence time in the slurry reactor must be at lest 10 minutes, preferably 20–100 min for obtaining a sufficient degree of polymerization. This is necessary to achieve polymer yields of at least 40 kg PP/g cat. It is also advantageous to operate the slurry reactor with high solid concentrations, e.g. 50% for homopolymers and 35 or 40% for some copolymers when the particles are swelling. If the solid concentration in the loop reactor is too low, the amount of reaction medium conducted to the second reaction zone or gas phase reactor is increasing.

In the case of indirect feed the first polymerization reaction is carried out in the presence of hydrogen, then the pressure of the first polymerization product including the reaction medium is optionally reduced after the reaction zone in order to evaporate volatile components of the products, e.g. in a flash tank. The polymer is led into the gas phase reactor fluidized bed. The off gas from the separation unit is lead to the gas phase reactor in gaseous form (indirect feed). Before entering the gas phase reactor some components e.g. hydrogen can be fully or partially removed from the off gas of the separation unit with various technical solutions, e.g. with membranes, condensing and stripping or distilling. Alternatively, the separation unit product can be led into the gas phase reactor in liquid form.

The second reactor is preferably a gas phase reactor, wherein propylene and optionally comonomer(s) are polymerized in reaction medium which consists of gas or vapour.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, e.g. monomer on such flow rate (at least 0.2 m/s) which make the particles act as a fluid. The fluidizing gas can contain also inert gases, like nitrogen and also hydrogen as a modifier. In the invention it is not recommendable to use unnecessary inert gases which may cause problems in the recovery section.

The gas phase reactor used can be operated in the temperature range of 50 to 115° C., preferably between 60 and 110° C. and reaction pressure between 10 and 40 bar and the partial pressure of the monomer is preferably between 2 and 30 bar or more, but always below the dew point pressure.

According to one preferred embodiment, no fresh propylene is fed to the first gas phase reactor other than what is required for various flushings.

The pressure of the second polymerization product including the gaseous reaction medium is then reduced after the first gas phase reactor in order to separate part of the gaseous and possible volatile components (e.g. heavy comonomers and compounds used for catalyst feeds) of the product e.g. in a flash tank. Some of the monomers, typically the heavier comonomers, can be recycled to the bulk reaction zone. The overhead gas stream is recirculated through the recovery system back to the first gas phase reactor or partly to the first gas phase reactor and partly to the slurry reactor.

If desired, the polymerization product can be fed into a second gas phase reactor and subjected to a third polymerization reaction to produce a modified polymerization product from which the polypropylene is separated and recovered. The third polymerization reaction is carried out in a gas phase reactor in the presence of comonomers which give the third polymerization product properties e.g. improved impact strength, ductility or softness.

It is further possible to transfer the product of the second gas phase reaction product to a third (fourth etc.) polymerization reaction zone, wherein polymerization is carried out in the presence of comonomers which give the third polymerization product properties e.g. improved stiffness to impact balance or stress whitening or white blush properties, ductility or softness.

Generally, if copolymers are produced by means of the present invention they contain at least 0.5 wt-% of comonomer(s), in particular at least about 2 wt-% and preferably up to 20 wt-% of at least one comonomer. A typical comonomer content of a copolymer fed to the first gas phase reactor is about 2 to 16 wt-% and that comonomer content can be raised in the gas phase reactor to up to about 20 wt-%.

Summarising what has been stated above, according to one particularly preferred embodiment of the invention propylene and optionally comonomers are polymerised in a loop reactor at a pressure of 40 to 80 bar, at a temperature of 60 to 100° C. and hydrogen is used to control the molar mass of the polymerization product, the polymerization product from the loop reactor is recovered and conducted to a flash separator, from where the hydrocarbon medium is removed from the top as the overhead and the polymer from the bottom, the overhead is treated in e.g. membrane unit to remove hydrogen and/or other components, the treated overhead is conducted to the next gas phase reactor, the polymer from the bottom is fed to next gas phase reactor fluid bed, optionally additional propylene and optional comonomer is fed to the gas phase reactor, optionally additional hydrogen is fed to the gas phase to control the hydrogen-to-propylene ratio to provide desired molecular mass of the polymerization product, the polymerization product from the first gas phase reactor is recovered and conducted to a flash tank, wherein the pressure of the product is reduced to produce an overhead product containing essentially non-reacted monomer(s) and hydrogen and a bottom product primarily containing polymerised solids, polypropylene polymer is recovered as the bottom product of the flash tank optionally the polymerization product from the second polymerization can be conducted directly or via a flash tank to a third (fourth etc.) gas phase polymerization reactor, wherein polymerization is carried out in the presence of comonomers.

Correspondingly, the preferred process configuration for preparing propylene homo- or copolymers comprises at least one slurry reactor and at least one gas phase reactor, arranged in series to form a cascade, a flash tank for separating polymer from reaction medium containing unreacted monomers and volatile compounds, said tank having an inlet for a polymerization product and an outlet for the polymer and an outlet for the reaction medium, a separation means, such as membranes, condensing means, stripping means or distilling means, for separating volatile compounds from the reaction medium, said separation means having an inlet for the reaction medium and an outlet for the reaction medium and an outlet for the volatile compounds, a first conduit interconnecting at least one slurry reactor with the inlet of the flash tank, a second conduit interconnecting the outlet of the polymer with at least one gas phase reactor a third conduit interconnecting the outlet of the reaction medium with the inlet of the separation means, and a fourth conduit interconnecting the outlet of the reaction medium with the gas phase reactor.

Figure 1:
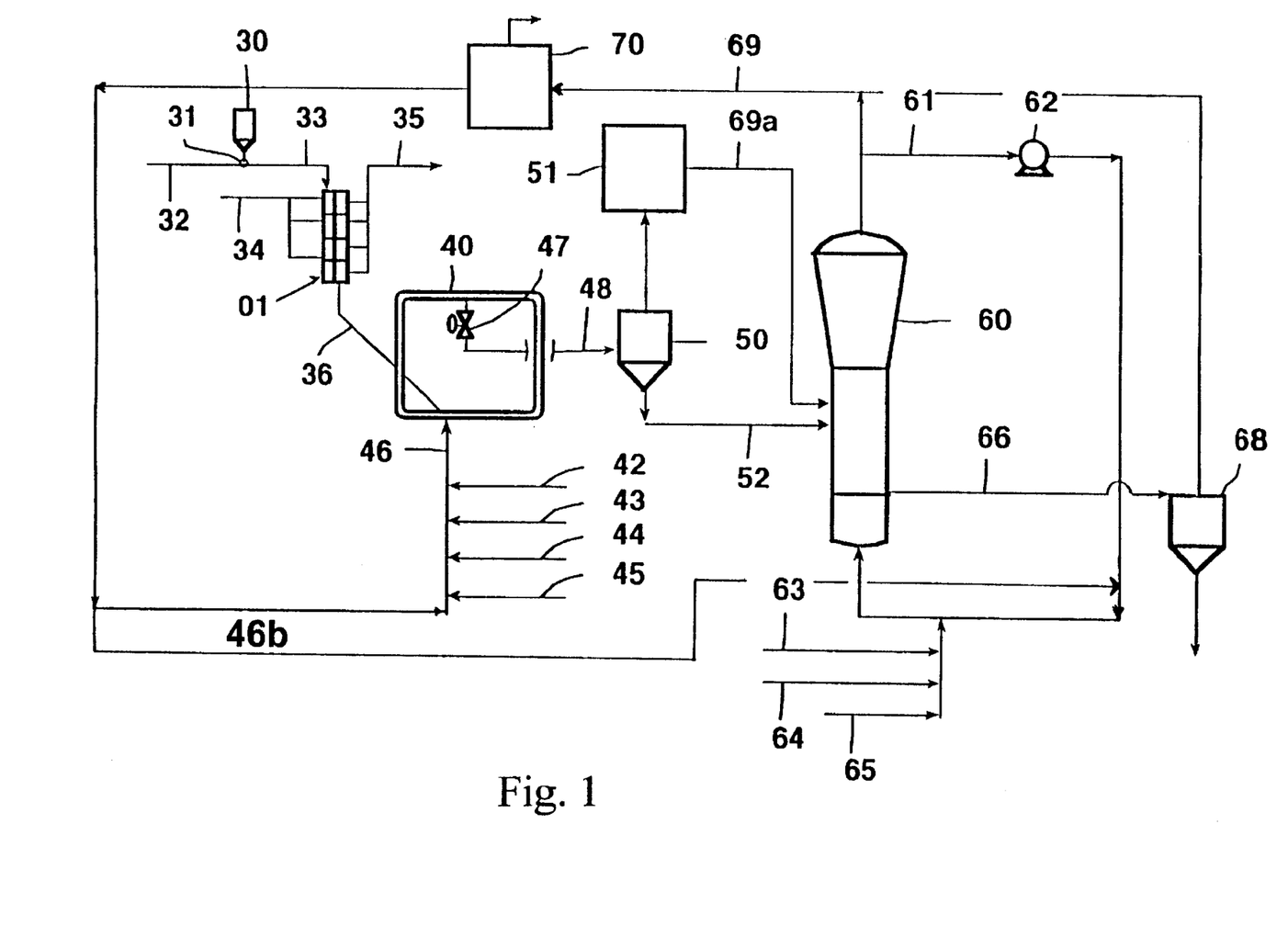
FIG. 1 depicts in a schematic fashion the process configuration of a preferred embodiment of the invention.

The preferred embodiment is also depicted in the attached drawing, which illustrates the particular configuration of the process equipment used. The reference numerals used refer to the following pieces of equipment:

1 prepolymerization reactor
30 catalyst reservoir
31 feeding device
32 diluent
33 catalyst/diluent mixture
34 monomer
35 cocatalyst and possible donors
40 loop reactor
42 diluent feed (optional)
43 monomer feed
44 hydrogen feed
45 comonomer feed (optional)
46 back to the loop reactor 40 through the line 46
47 one or several exhaust valve
48 product transfer line
50 flash separator
51 recovery unit and off gas vent
52 removing line
60 gas phase reactor
61 gas transfer line
62 compressor
63 monomer feed
64 comonomer feed
65 hydrogen feed
66 transfer line
67 product transfer line
68 polymer product recovery system, e.g. flash tank
69 recovery line
70 monomer recovery system
71 separation unit Turning to FIG. 1, it can be noted that catalyst from reservoir 30 is fed to the feeding device 31 together with optional diluent or monomer from line 32. The feeding device 31 feeds the catalyst/diluent mixture into the prepolymerization chamber 1 via line 33. Monomer is fed through 34 and cocatalyst and possible donors can be fed into the reactor 1 through conduits or preferably contacted with catalyst and donor already in line 33.

From the prepolymerization chamber 1 the prepolymerized catalyst is removed preferably directly through line 36 and transferred to a loop reactor 40. In the loop reactor 40 the polymerization is continued by adding optional diluent from the line 42, monomer from line 43, hydrogen from line 44 and an optional comonomer from line 45 through the line 46. An optional cocatalyst can also be introduced into the loop reactor 40.

From the loop reactor 40 the polymer-hydrocarbon mixture is fed through one or several exhaust valves 47. The product of the slurry reactor 40 is conducted to a flash separator 50. The hydrocarbon medium is removed from the polymer particles, the remaining monomer and hydrogen are removed from the flash separator 50 either through the line 51 to the recovery unit (not presented) or preferably to gas phase reactor 60 through the line 69 after possible separation of light components e.g. hydrogen. The numeral 70 signifies separation means, such as a membrane unit or a stripping column which is capable of freeing the overhead of the flash separator 50 from hydrogen or light inert hydrocarbons.

In the lower part of the gas phase reactor 60 there is a fluid bed consisting of polymer particles, which will be kept in a fluidized state in an ordinary way by circulating the gases removed from the top of the reactor 60 though line 61, compressor 62 and a heat exchanger (not presented) to the lower part of the reactor 60 or preferably recycle stream in an ordinary way. The reactor 60 is advantageously, but not necessarily, equipped with a mixer (not presented). To the lower part of the reactor 60 can be led in a well known way monomers from line 63, optionally comonomer from line 64 and hydrogen from the line 65. The product will be removed from the reactor 60 continually or periodically through the transfer line 66 to the flash tank 68. The overhead product of the recovery system is circulated to the gas phase reactor via a monomer recovery system.

Optionally, the recovered product can be led to an additional gas removal tank thereafter to a rubber gas phase (reactor).

The numeral 71 signifies separation means, such as a membrane unit or a stripping column, which is capable of freeing the recycle monomer of the gas phase reactor 60 or of the separator 50 from hydrogen and/or light inert hydrocarbons typically having a lower boiling point than the monomer(s).

The Polymer Product

The process according to the invention is useful for preparing propylene copolymers with good impact and creep properties. In particular the process can be employed to produce alloys of homo/random and random/homo propylene polymers.

The following non-limiting examples illustrate the principles of the present invention.

EXAMPLE 1

A production scale plant was simulated to produce continuously PP-copolymer with good impact and creep properties. The plant comprises a catalyst, alkyl, donor, ethylene and propylene feed systems, a prepolymerization reactor, a loop reactor, a flash tank and 2 fluidized bed gas phase reactors.

Catalyst, alkyl, donor and propylene were fed to prepolymerization reactor. The polymer slurry from the prepolymerization reactor was fed to a loop reactor in which also hydrogen and more propylene was fed. The polymer slurry from the loop reactor was fed to a flash tank where propylene and polymer were separated.

The polymer from flash tank was fed to the first GPR. Propylene from flash tank was fed to the first GPR after removal of hydrogen. Ethylene and additional propylene was fed to the first GPR.

The polymer from the first GPR was fed to the second GPR. Ethylene, some hydrogen and additional propylene were fed to the second GPR.

The production in the reactors comprised 300 kg/h in prepolymerization, 10 t/h in loop and 10 t/h in the first GPR and 6 t/h in the second GPR.

The prepolymerization reactor was operated at a pressure of 56 bar and a temperature of 20° C. The loop reactor was operated at a pressure of 55 bar and a temperature of 85° C. The MFR (2.16 kg, 230° C.) of the PP-homopolymer produced in the loop was adjusted to 100 by regulating the hydrogen feed.

The GPR was operated at a pressure of 35 bar and a temperature of 80° C. The MFR (2.16 kg, 230° C.) of the PP taken out of the GPR was set at 0.4 by controlling the production split between the reactors and the efficiency of hydrogen removal of flashed propene. Ethylene content was adjusted to 2% w/w by regulating the partial pressure of ethylene and controlling the production split between the reactors.

The second GPR was operated at a pressure of 20 bar and a temperature of 70° C. The MFR (2.16 kg, 230° C.) of the PP-copolymer in taken out of the second GPR was set at 0.3 by adjusting the partial hydrogen pressure and by controlling the production split between the reactors. Minor amounts of propylene were circulated from the second GPR back to the loop reactor.

EXAMPLE 2

A production scale plant was simulated to produce continuously PP-copolymer with good creep properties. The plant comprises a catalyst, alkyl, donor, ethylene and propylene feed systems, a prepolymerization reactor, a loop reactor, a flash tank and a fluidized bed gas phase reactor.

The polymer slurry from the prepolymerization reactor was fed to a loop reactor in which also hydrogen and more propylene was fed. The polymer slurry from the loop reactor and additional hydrogen and propylene was fed to GPR.

The catalyst, alkyl, donor and propylene were fed to the prepolymerization reactor. The polymer slurry from the prepolymerization reactor was fed to a loop reactor into which also ethylene and more propylene was fed. The polymer slurry from the loop reactor was fed to a flash tank where monomers and polymer were separated.

The polymer from the flash tank was fed to the GPR. Propylene from the flash tank was fed to the GPR after removal of ethylene. Hydrogen and additional propylene was fed to the GPR.

The production in the reactors comprised 300 kg/h in prepolymerization, 10 t/h in loop and 10 t/h in the first GPR The prepolymerization reactor was operated at a pressure of 56 bar and a temperature of 20° C. The loop reactor was operated at a pressure of 55 bar and a temperature of 75° C. The MFR (2.16 kg, 230° C.) of the random-PP produced in the loop was below 0.1 and the ethylene content was adjusted to 3.5% w/w by regulating the ethylene feed.

The GPR reactor was operated at a pressure of 35 bar and a temperature of 80° C. The MFR (2.16 kg, 230° C.) of the PP-copolymer taken out of the GPR was set at 0.3 by adjusting the partial pressure of hydrogen. The ethylene content was controlled to be 1.8% w/w via the production split between the reactors.

Ethylene in the loop outlet was recovered from flash gases and circulated back to the loop reactor. Propylene in GPR outlet was recovered and fed to the loop reactor after removal of hydrogen. The once-through conversion of the propylene and ethylene were 83% and 84%, respectively.

EXAMPLE 3

A pilot plant operated continuously is used to produce PP-copolymer with good impact and creep properties. The plant comprises a catalyst, alkyl, donor, propylene and ethylene feed systems, a prepolymerization reactor, a loop reactor and two fluidized bed gas phase reactors (GPR).

The catalyst, alkyl, donor and propylene are fed to the prepolymerization reactor. The polymer slurry from the prepolymerization reactor is fed to a loop reactor in which also hydrogen, ethylene and additional propylene are fed.

The polymer slurry from the loop reactor and additional hydrogen and propylene are fed to the 1st GPR. The polymer from 1st GPR is fed to 2nd GPR. Ethylene, some hydrogen and additional propylene was fed to the second GPR. The formed polymer and unreacted propylene are separated after removal from 2nd GPR.

The catalyst used is a highly active and stereospecific ZN-catalyst made according to U.S. Pat. No. 5,234,879. The catalyst is contacted with triethylaluminium (TEA) and dicyclopentyldimethoxysilane (DCPDMS) (Al/Ti ratio is 150 and Al/Do 10 (mole)) before feeding to the prepolymerization reactor.

The catalyst is fed according to U.S. Pat. No. 5,385,992 and is flushed with propylene to the loop reactor. The prepolymerization reactor is operated at a pressure of 51 bar, a temperature of 20° C. and a mean residence time of the catalyst of 7 min.

The loop reactor is operated at 50 bar pressure, 75° C. temperature and mean residence time of the catalyst at 1 h. The MFR (2.16 kg, 230° C.) of the PP-randompolymer produced in the loop is controlled to be 7 via hydrogen feed. The ethylene content is controlled to be 3.5% w/w via ethylene feed.

The polymer slurry from the loop reactor is transferred to the 1st GPR. The 1st GPR reactor is operated at 29 bar total pressure and 21 bar partial pressure of propylene, 80° C. temperature and mean residence time of the catalyst at 1.5 h. The MFR (2.16 kg, 230° C.) of the PP-randompolymer taken out of the GPR is controlled to be 10 via partial pressure of hydrogen. The ethylene content is controlled to be 2% w/w via production split between the reactors.

The polymer from the 1st GPR is transferred to the 2nd GPR. The 2nd GPR reactor is operated at 10 bar total pressure and 7 bar partial pressure of monomers, 80° C. temperature and mean residence time of the catalyst at 1.5 h. The MFR (2.16 kg, 230° C.) of the PP-copolymer taken out of the GPR is controlled to be 7 via partial pressure of hydrogen. The ethylene content is controlled to be 10% w/w via partial pressure of ethylene and controlling the production split between the reactors.

Desired properties are achieved with production split 1% in prepolymerization, 40% in loop and 40% in the first GPR and 19% in the second GPR.

EXAMPLE 4

A pilot plant operated continuously was used to produce PP-copolymer with good creep properties. The plant comprises a catalyst, alkyl, donor, propylene and ethylene feed systems, prepolymerization reactor, loop reactor and a fluidized bed gas phase reactor (GPR).

Catalyst, alkyl, donor and propylene was fed to the prepolymerization reactor. The polymer slurry from the prepolymerization reactor was fed to a loop reactor in which also hydrogen, additional propylene was fed.

The polymer slurry from the loop reactor was fed to a flash tank where monomers and polymer were separated. The polymer from flash tank was fed to the GPR. Propylene from flash tank was fed to the GPR after removal of hydrogen. Ethylene, additional hydrogen and additional propylene was fed to the GPR.

The catalyst used was a highly active and stereospecific ZN-catalyst made according to U.S. Pat. No. 5,234,879. The catalyst was contacted with triethylaluminium (TEA) and dicyclopentyldimethoxysilane (DCPDMS) (Al/Ti ratio was 140 and Al/Do 10 (mole)) before feeding to the prepolymerization reactor.

The catalyst was fed according to U.S. Pat. No. 5,385,992 and was flushed with propylene to the loop reactor. The prepolymerization reactor was operated at a pressure of 51 bar, a temperature of 20° C. and a mean residence time of the catalyst of 7 min.

The loop reactor was operated at a pressure of 50 bar, a temperature of 75° C. and a mean residence time of the catalyst of 1 h. The MFR (2.16 kg, 230° C.) of the PP-randompolymer produced in the loop was adjusted to 10 by regulating the hydrogen feed.

The GPR reactor was operated at a total pressure of 29 bar and a partial propylene pressure of 16 bar, a temperature of 80° C. and a mean residence time of the catalyst of 1.1 h. The MFR (2.16 kg, 230° C.) of the PP-copolymer taken out of the GPR was adjusted to 5 by regulating the partial hydrogen pressure and by adjusting the production split between the reactors. The ethylene content was set at 3.5% w/w by adjusting the production split between the reactors and the partial pressure of ethylene.

The desired properties are achieved with a production split of 1% in prepolymerization, 40% in loop and 59% in the GPR.

The polymer from the GPR could have been transferred to another GPR to produce PP copolymer with better impact properties by having even higher partial pressure of ethylene in the 2nd GPR.

What is claimed is:

1. A process for preparing a propylene polymer selected from the group consisting of homopolymers of propylene, copolymers of propylene and alloys of propylene homopolymers and copolymers having different molar mass and comonomer distribution, which comprises the steps of:
   polymerizing propylene optionally with comonomers in the presence of a catalyst at an elevated temperature of at least 60° C. and at an elevated pressure in at least one slurry reactor and at least one gas phase reactor, at least 10% of the polymer product being produced in the gas phase reactor(s),
   recovering from the slurry reactor a polymerization product containing unreacted monomers,
   separating volatile components from the product in a separation unit,
   recovering the polymerization product from the separation unit and conducting it to a first gas phase reactor, and
   recovering at least a part of the volatile components from the separation unit and conducting them to a first gas phase reactor essentially without recycling unreacted monomers to the slurry reactor.

2. The process according to claim 1, wherein the polymerization product of the slurry reactor comprises polymeric substances selected from the group consisting of polypropylene, propylene copolymers and mixtures of polypropylene and propylene copolymers.

3. The process according to claim 1, wherein less than 30 wt-% of the unreacted monomers are recycled to the slurry reactor.

4. The process according to claim 3, wherein less than 20 wt-% of the unreacted monomers are recycled back to the slurry reactor.

5. The process according to claim 1, wherein the slurry reactor comprises a loop reactor and wherein the concentration of propylene in the reaction median is over 60 wt-% for forming a product in particulate form.

6. The process according to claim 1, wherein the slurry reactor is operated at a temperature in the range of 60 to 80° C. for preparing random and ter-copolymers.

7. The process according to claim 1, wherein the slurry reactor is operated at a temperature in the range of 80° C. to the critical temperature of the reaction medium.

8. The process according to claim 1, wherein the slurry reactor is operated at the critical temperature of the reaction medium and below the softening temperature of the polymer.

9. The process according to claim 1, wherein the slurry reactor is operated at a pressure in the range of 35 to 100 bar.

10. The process according to claim 1, wherein the catalyst comprises a catalyst component, a cocatalyst compound, an external donor and, optionally, an internal donor.

11. The process according to claim 10, wherein the catalyst contains an external donor having the general formula $R'_2(MeO)_2Si$, wherein in R' represents a branched or cyclic aliphatic, or aromatic group.

12. The process according to claim 10, wherein the external donor is selected from the group consisting of dicyclopentyl dimethoxy silane and di-t-butyl dimethoxysilane.

13. The process according to claim 1, wherein the catalyst system is a metallocene catalyst comprising a bridged catalyst complex, a catalytic metal halide, an aluminum alkyl, and a support.

14. The process according to claim 13, wherein the catalytic metal halide comprises $ZrCl_2$ and the support comprises silica.

15. The process according to claim 1, wherein the polymerization product fed to the first gas phase reactor contains copolymers comprising 2 to 12 wt-% of at least one comonomer.

16. The process according to claim 15, wherein the polymerization product is copolymerized in the first gas phase reactor with additional comonomers to increase the comonomer content.

17. The process according to claim 16, wherein the comonomer content is increased to up to 20 wt-%.

18. The process according to claim 1, wherein polymerization in the first gas phase reactor is carried out without additional monomer feed.

19. The process according to claim 1, wherein a polymerization product is recovered from the gas phase reactor.

20. The process according to claim 19, wherein the polymerization product is subjected to copolymerization in the presence of comonomers.

21. The process according to claim 20, wherein the polymer product is recovered and subjected to further copolymerization.

22. The process according to claim 21, wherein the further copolymerization reaction is carried out in a third gas phase reactor arranged in series with a second gas phase reactor.

23. The process according to claim 22, wherein the copolymer from the third gas phase reactor is subjected to at least one further copolymerization reaction in at least one further reactor.

24. The process according to claim 1, wherein at least part of the unreacted monomers are recovered from the second and/or third gas phase reactor and recycled back to the first and/or second gas phase reactor, respectively.

25. The process according to claim 1, wherein a part of the unreacted monomers recovered from a gas phase reactor are recycled back to a slurry reactor.

26. The process according to claim 17, wherein the amount of monomers recycled comprises 1 to 50 wt-% of the amount of monomers in the feed of the slurry reactor.

27. The process according to claim 1, wherein the production rate of the slurry reactor is 10 to 50 wt-% of the total production rate of the slurry and the first gas phase reactor.

28. The process according to claim 1, wherein hydrogen is used in at least one reactor as a molar mass modifier.

29. The process according to claim 1, wherein the pressure of the polymerization product of the slurry reactor is reduced after the slurry reactor to evaporate volatile components, the volatile components are recovered to form a gaseous product, non-condensable or inert substances are separated from the gaseous product, and the rest of the gaseous product is conducted to the gas phase reactor.

30. The process according to claim 29, wherein the non-condensable or inert substances are selected from the group of hydrogen and lower alkanes, which are optionally recovered.

31. The process according to claim 1, wherein the catalyst used is prepolymerized before feeding it into the process.

32. A process for preparing propylene homopolymers and copolymers, which comprises the steps of:
    subjecting propylene optionally with comonomers to polymerization in the presence of a catalyst at elevated temperature and pressure in at least one slurry reactor to produce a first polymerization product comprising propylene polymer and unreacted monomers,
    recovering the polymer and the unreacted monomers,
    feeding the polymer and the unreacted monomers into a flash tank to separate an overhead product containing unreacted monomers from the polymer,
    feeding the polymer from the flash tank to a gas phase reactor,
    conducting the overhead product into a separation unit wherein the monomers are condensed,
    recovering the condensed monomers and feeding essentially all of them into said gas phase reactor,
    subjecting the polymers and the unreacted monomers to polymerization in said gas phase reactor to produce a second polymerization product containing propylene polymer and gaseous substances, and
    recovering the propylene polymer.

33. The process according to claim 32, wherein the propylene polymer is fed to a further gas phase reactor for copolymerization.

34. The process according to claim 32, wherein hydrogen is used as molar mass modifier in at least one of the reactors.

35. The process according to claim 32, wherein the polymerization in said gas phase reactor is carried out essentially without additional feed of monomers.

36. The process according to claim 32, wherein the first polymerization product is conducted to a flash tank to reduce the pressure thereof and in order to separate a gaseous product, unreacted monomers are recovered from the gaseous product, and the unreacted monomers are fed into the gas phase reactor.

37. The process according to claim 36, wherein hydrogen and/or inert hydrocarbons are separated from the gaseous product.

38. The process according to claim 37, wherein hydrogen and/or inert hydrocarbons are separated by membranes or stripping.

39. An apparatus for preparing propylene homo- or copolymers, which comprises:
    at least one slurry reactor and at least one gas phase reactor, arranged in series to form a cascade,
    a flash tank for separating polymer from reaction medium containing unreacted monomers and volatile compounds, said tank having an inlet for a polymerization product and a polymer outlet and a reaction medium outlet,
    a separation means for separating volatile compounds from the reaction medium, said separation means having an inlet for the reaction medium and a reaction medium outlet and an outlet for the volatile compounds,
    a first conduit connecting at least one slurry reactor with the inlet of the flash tank,
    a second conduit connecting the polymer outlet with at least one gas phase reactor,
    a third conduit connecting the reaction medium outlet with the inlet of the separation means, and
    a fourth conduit connecting the outlet of the reaction medium with the gas phase reactor.

40. The apparatus according to claim 39, wherein the separation means is selected from the group of membranes, condensing means, strippings means and distilling means.

* * * * *